United States Patent
Minemura

(10) Patent No.: US 8,909,828 B2
(45) Date of Patent: Dec. 9, 2014

(54) ELECTRONIC DEVICE AND AUDIO OUTPUT METHOD

(71) Applicant: Kabushiki Kaisha Toshiba, Tokyo (JP)

(72) Inventor: Takashi Minemura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/270,210

(22) Filed: May 5, 2014

(65) Prior Publication Data

US 2014/0240596 A1    Aug. 28, 2014

Related U.S. Application Data

(62) Division of application No. 13/614,795, filed on Sep. 13, 2012.

(30) Foreign Application Priority Data

Nov. 30, 2011    (JP) .................................. 2011-263056

(51) Int. Cl.
*G06F 3/00* (2006.01)
*H04N 5/04* (2006.01)
*G06F 5/00* (2006.01)

(52) U.S. Cl.
CPC ...................................... *H04N 5/04* (2013.01)
USPC ............................... 710/61; 348/512; 381/58

(58) Field of Classification Search
CPC ......... G06F 3/00; G06F 1/00; G06F 2003/00; H04N 13/00
USPC .................... 710/58–61; 348/512; 381/58–61
See application file for complete search history.

(56) References Cited

U.S. PATENT DOCUMENTS

| | | | |
|---|---|---|---|
| 6,744,473 B2* | 6/2004 | Wells | 348/515 |
| 7,983,165 B2* | 7/2011 | Li et al. | 370/235 |
| 8,255,957 B1* | 8/2012 | Mattox | 725/63 |
| 2004/0213411 A1* | 10/2004 | Sakagami | 381/1 |
| 2004/0236582 A1 | 11/2004 | Yoshikai et al. | |
| 2008/0077261 A1* | 3/2008 | Baudino et al. | 700/94 |
| 2008/0092204 A1* | 4/2008 | Bryce et al. | 725/143 |
| 2009/0290064 A1* | 11/2009 | Matsumoto et al. | 348/515 |

(Continued)

FOREIGN PATENT DOCUMENTS

| | | |
|---|---|---|
| JP | 2004-282667 A | 10/2004 |
| JP | 2004-350014 A | 12/2004 |
| JP | 2007-214976 A | 8/2007 |

(Continued)

OTHER PUBLICATIONS

First Office Action mailed Nov. 20, 2012, in Japanese Pat. App. No. 2011-263056 in seven (7) pages.

*Primary Examiner* — Christopher Shin

(74) *Attorney, Agent, or Firm* — Knobbe, Martens, Olson & Bear LLP

(57) ABSTRACT

According to one embodiment, an electronic device including, a display, an audio output module, a transmission module, a first detection module, a second detection module, a third detection module, and a controller configured to control at least one of the timing of the transmission of the audio signal by the transmission module and the timing of the output of the first reproduction output by the audio output module in accordance with the time difference detected by the third detection module, and to switch whether or not to control the timing in accordance with the positional relationship between the electronic device and the partner device.

5 Claims, 7 Drawing Sheets

(56) References Cited

U.S. PATENT DOCUMENTS

| | | | |
|---|---|---|---|
| 2010/0014005 A1 | 1/2010 | Yano et al. | |
| 2010/0128176 A1* | 5/2010 | Nakajima et al. | 348/512 |
| 2010/0183163 A1* | 7/2010 | Matsui et al. | 381/66 |
| 2010/0323793 A1* | 12/2010 | Andall | 463/35 |
| 2011/0222715 A1* | 9/2011 | Sato et al. | 381/303 |
| 2012/0237184 A1* | 9/2012 | Takeuchi | 386/248 |
| 2014/0160351 A1* | 6/2014 | Ejima | 348/515 |

FOREIGN PATENT DOCUMENTS

| | | |
|---|---|---|
| JP | 2008-131341 A | 6/2008 |
| JP | 2008-219819 A | 9/2008 |
| JP | 2010-011274 A | 1/2010 |
| WO | WO 2008/056622 A1 | 5/2008 |

* cited by examiner

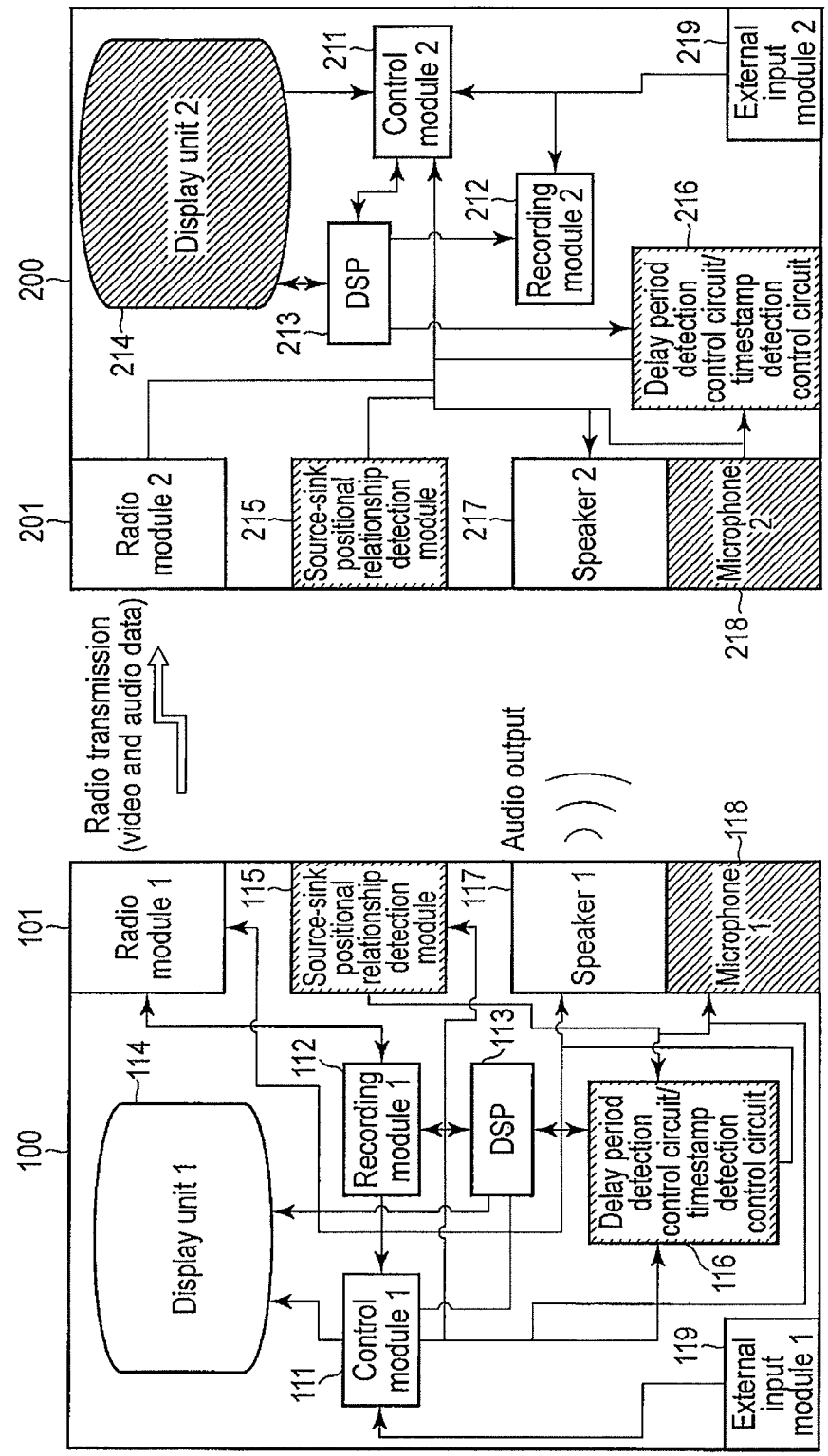
F I G. 2A

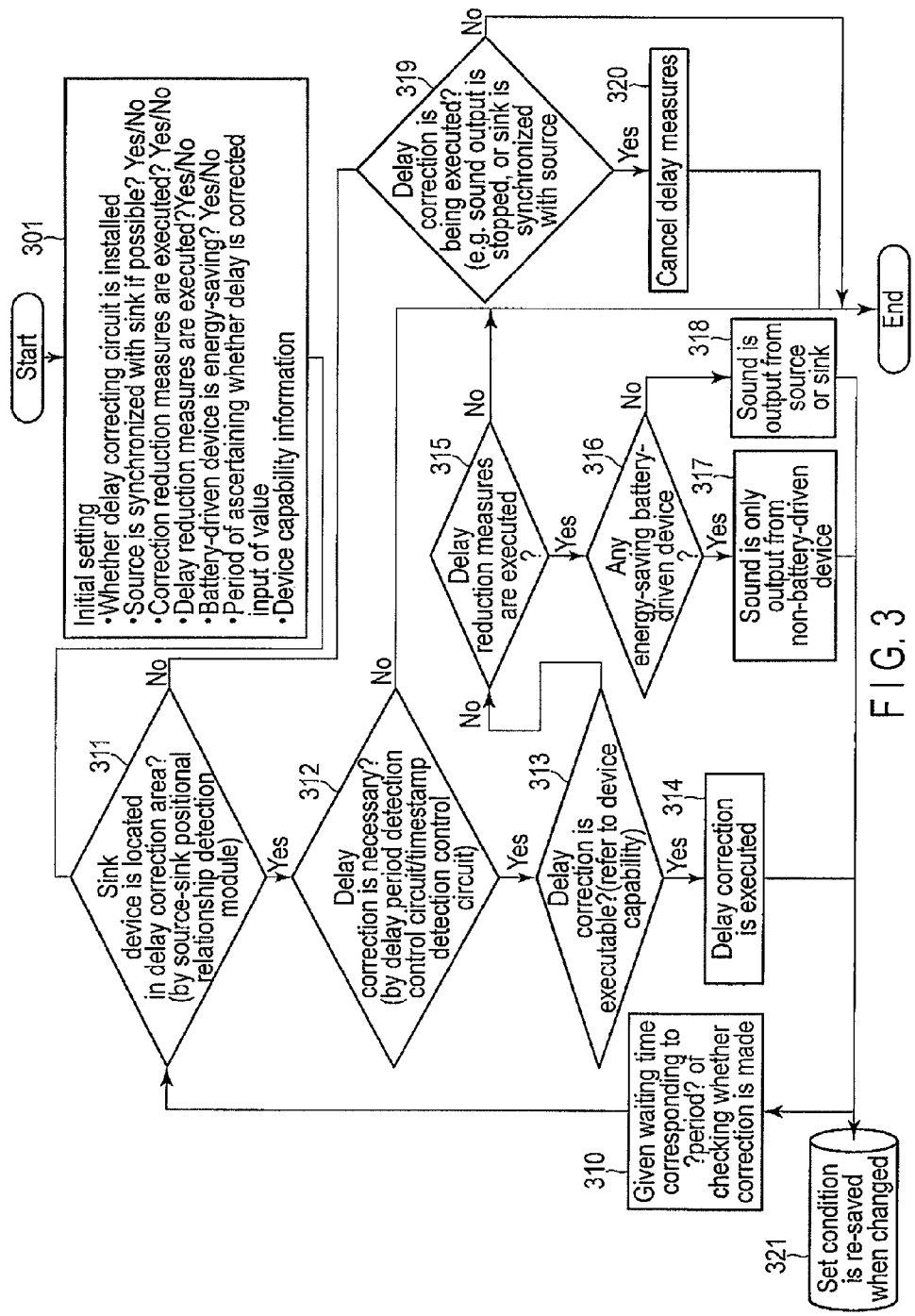
F I G. 3

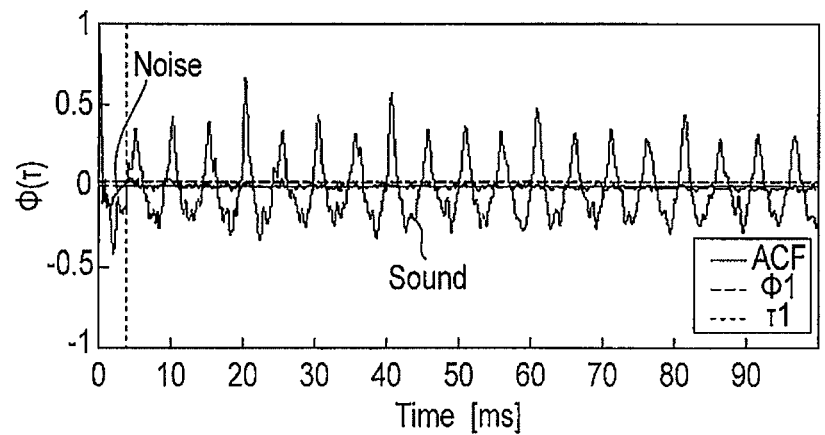
F I G. 7
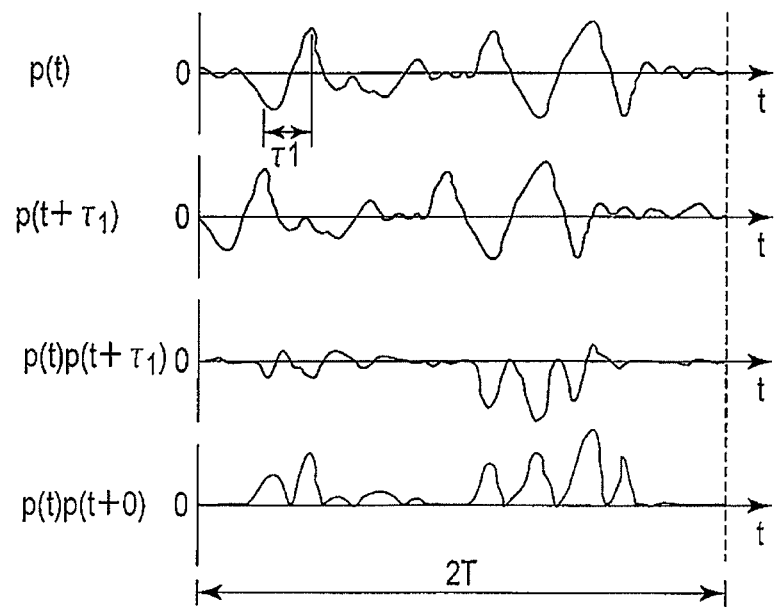
F I G. 8

ELECTRONIC DEVICE AND AUDIO OUTPUT METHOD

CROSS-REFERENCE TO RELATED APPLICATIONS

This application is a divisional of U.S. patent application Ser. No. 13/614,795, filed Sep. 13, 2012, which is based upon and claims the benefit of priority from prior Japanese Patent Application No. 2011-263056, filed Nov. 30, 2011, the entire contents of each of which are incorporated herein by reference.

FIELD

Embodiments described herein relate generally to an electronic device and an audio output method for reproducing content comprising images such as moving images or still images and sound (audio).

BACKGROUND

There has been known a method of enjoying content (which may otherwise be referred to as a program or a title) comprising images such as moving images or still images and sound (audio). According to this method, video data being reproduced/displayed by an electronic device (which may otherwise be referred to as a first apparatus or a source device) is transmitted to a portable terminal device (which may otherwise be referred to as a second apparatus or a sink device) carried by a user, and reproduced in the portable terminal device.

Meanwhile, according to such a technique, there may be a time difference between video and audio output timing in the electronic device (source device) and video and audio output timing in the portable terminal device (sink device).

However, if a delay period is corrected, processing becomes complex due to the correction of the delay between the sink device and the source device, and the devices may lose their quick response performance. Therefore, it is preferable that audio reproduction output can be suitably controlled in the sink device and the source device to keep a balance between delay measures and the quick response performance.

In particular, information is provided, for example, by near-field radio communication, a final enjoyable time is short despite enough operable time of an audiovisual device if the operating time at an information provider is short.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2A is an exemplary diagram showing an example of primary components of a first reproducer (source device) and a second reproducer (sink device) according to an embodiment;

FIG. 3 is an exemplary diagram showing an example of the detection of the distance between the reproducers and the setting of audio output transmission timing according to an embodiment;

FIG. 7 is an exemplary diagram showing an example of the detection of audio reproduction outputs (noise determination) of the reproducers according to an embodiment; and FIG. 8 is an exemplary diagram showing an example of the detection (identity) of audio reproduction outputs of the reproducers according to an embodiment.

DETAILED DESCRIPTION

Various embodiments will be described hereinafter with reference to the accompanying drawings. In general, according to one embodiment, an electronic device including: a display configured to display images; an audio output module configured to reproduce an audio signal to output a first reproduction output; a transmission module configured to transmit the audio signal to a partner device; a first detection module configured to detect a second reproduction output reproduced by the partner device from the audio signal transmitted by the transmission module or to detect an audio output that is output by the partner device; a second detection module configured to detect a parameter regarding the positional relationship between the partner device and the electronic device; a third detection module configured to detect a time difference between the second reproduction output of the partner device detected by the first detection module and the first reproduction output that is output by the audio output module; and a controller configured to control at least one of the timing of the transmission of the audio signal by the transmission module and the timing of the output of the first reproduction output by the audio output module in accordance with the time difference detected by the third detection module, and to switch whether or not to control the timing in accordance with the positional relationship between the electronic device and the partner device.

Embodiments will now be described hereinafter in detail with reference to the accompanying drawings.

Figure 1A:
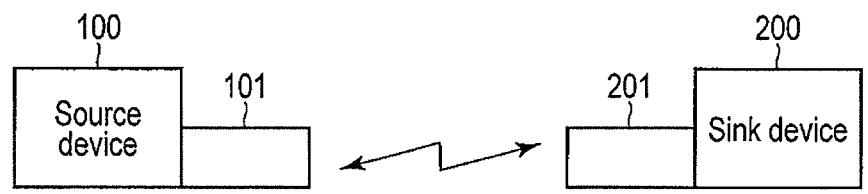
FIG. 1A is an exemplary diagram showing an example of radio communication connection between a reproducer (electronic device) and a reproducer (electronic device) according to an embodiment.
Figure 1B:
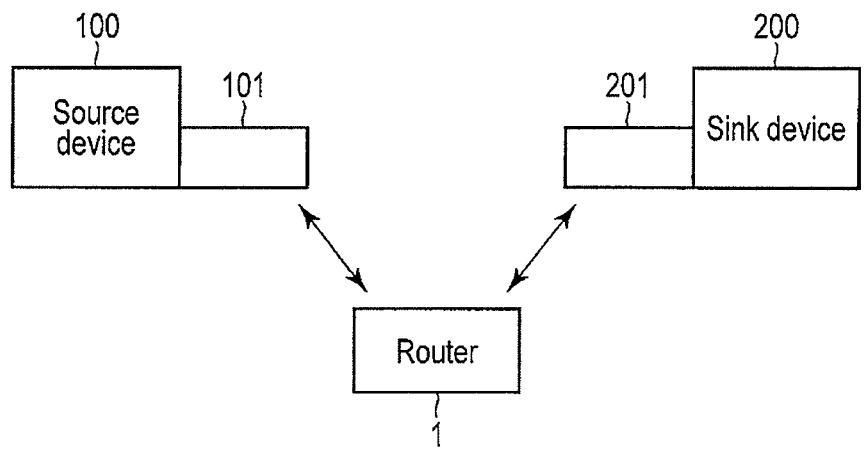
FIG. 1B is an exemplary diagram showing an example of radio communication connection between a reproducer (electronic device) and a reproducer (electronic device) according to an embodiment.

FIG. 1A and FIG. 1B show an example of connection on a network comprising recorder and/or reproducer according to the embodiment. Various elements (components) described below may be provided by hardware or may be provided by software using, for example, a CPU (microcomputer).

In FIG. 1A, a first reproducer (which may otherwise be referred to as a source device) 100 can use a radio communication unit (radio communication module/means 1) 101 to pass control signals to a radio communication unit (radio communication module/means 2) 201 of a second reproducer (which may otherwise be referred to as a sink device) 200 and to transmit data (content, images, and sound [audio]) to the second reproducer 200. The first reproducer 100 and the radio communication unit (radio communication module/means 1) 101 connected thereto or the second reproducer 200 and the radio communication unit (radio communication module/means 2) 201 connected thereto may be prepared as one, or may be connected to each other by a predetermined interface.

As long as the first reproducer 100 can display images in accordance with video signals and sound (audio) signals and can reproduce sound (audio) in accordance with audio signals, the first reproducer 100 may have any internal configuration and may be any combination of units or modules. For example, the first reproducer 100 may be a television broadcast receiver (which may otherwise be simply referred to as a television set), a combination of a recorder and a monitor, or a combination of a set top box (STB, recognized as an external tuner) and a monitor.

As long as the second reproducer 200 can display images in accordance with video signals and sound (audio) signals and can reproduce sound (audio) in accordance with audio signals, the second reproducer 200 may have any internal configuration and may be any combination of units or modules. For example, the second reproducer 200 may be an audiovisual (AV) amplifier (which may otherwise be referred to as a repeater) and a connected speaker (audio reproducer), an audio device which is a combination of an AV amplifier and a speaker, a combination of a recorder and a monitor, a portable terminal device (for example, a tablet computer, a notebook computer, a cellular telephone capable of reproducing video data, a smartphone), or a television set.

As shown in FIG. 1B, the first reproducer 100 and the second reproducer 200 may be connected to each other (capable of exchanging control signals and data) via a router (network manager) 1 comprising, for example, a domestic local area network (LAN). In FIG. 1B, the router 1 may enable the (whole) domestic LAN to be a wireless system or the router 1 may be wireless on part of its connection (path). Nowadays, speed is significantly increased (communication capacity is increased) in a network comprising the router 1. It is possible to use near-field radio communication standards such as Bluetooth (registered trademark) and power line communication (PLC). The router 1 may function as a server.

Primary components of the first reproducer (source device) and the second reproducer (sink device) shown in FIG. 1A are illustrated in FIG. 2A.

The source device (television set) 100 comprises a main controller (main processing unit [MPU] or main control block), or control module 1) 111, a recorder (recording module 1) 112, a signal processing module (digital signal processor [DSP] 1) 113, a display unit (monitor module (video display device or display) 1) 114, a source-sink positional relationship detection module (positional relationship detection module 1) 115, a delay period detection control circuit (timestamp detection control circuit, delay detection module 1) 116, a speaker (audio reproduction module 1) 117, a microphone (acoustic signal detection module 1) 118, and an external input module (input module 1) 119 for receiving the input of video signals and sound (audio) signals, that is, content. The main controller (control module 1) 111 is connected to the radio communication unit (radio communication module/means 1) 101. The radio communication unit (radio communication module/means 1) 101 does not exclusively communicate directly with the communication partner device (second reproducer 200), and has only to be able to communicate with the router 1, as in the example shown in FIG. 1B.

The main controller (control module 1) 111 comprises, for example, a recording/reproduction processing module (management information processing module/timestamp processing module), an encode parameter detection/processing module, a graphical user interface (GUI) display control module, and an SDRAM (main memory). The main controller (control module 1) 111 controls the elements in the reproducer 100, handles user operations (input instructions) through, for example, a remote controller, and controls the recording, reproduction, copying, moving, erasing, and editing of content (programs). The main controller (control module 1) 111 also controls the communication between the radio communication unit 101 and the communication partner device. The radio communication unit 101 can independently handle the reception of a wake-up command coming from the communication partner device and a wake-on-Lan command coming from the communication partner device via the router 1, and also handle part of the processing compliant with the received command. In accordance with the result of the processing, the radio communication unit 101 supplies a predetermined control signal to a specific component of the source device 100 through the main controller 111.

For example, the recorder (recording module 1) 112 records, in a predetermined format, content which has been processed into a predetermined format in the DSP 113 or the main controller 111 and which has been input through the input module 119, and programs obtained by demodulating broadcast waves. The recorder 112 holds, as the above-mentioned information, various files in the form of digital signals. As the files, various kinds of data, for example, audio/video content, or text data such as characters and picture data are widely known. Regarding video (moving images), for example, Moving Picture Experts Group (MPEG) 1, 2, and 4 (H.264/AVC) are widely known. Regarding audio (sound/music), for example, MPEG audio layer 3 (MP3), audio code number 3 (AC3), and linear pulse-code module (PCM) are widely known. Regarding still images, for example, Joint Photographic Experts group (JPEG) is widely known. Nowadays, a semiconductor memory (solid-state drive [SSD] such as a Secure Digital [SD] card) can be used as a recording medium.

Mainly under the control of the controller 111, the DSP 113 uses the SDRAM as a work memory, for example, to transfer data (content), create thumbnail images (reduced images) corresponding to given images (still images or moving images) of content, and generate video signals that can be displayed by the display unit 114 and audio signals that can be reproduced by the speaker 117.

The display unit 114 reproduces the video signals supplied from the DSP 113, and displays images visible to the user. The display on the display unit 114 may be display in the form of GUI images output by the GUI display control unit that are superposed on one another with predetermined transmissivity (for example, to wait for an instruction input by the user).

Although described later in detail, the source-sink positional relationship detection module (positional relationship detection module 1) 115 estimates (detects) the distance from the communication partner (for example, the second reproducer 200) with which the radio communication unit 101 communicates, and the presence of a boundary (for example, a wall in a house) therebetween.

The delay period detection control circuit (timestamp detection control circuit, delay detection module 1) 116 controls whether to execute delay correcting processing in accordance with the distance estimated by one of the source-sink positional relationship detection module (positional relationship detection module 1) 115 or the source-sink positional relationship detection module (positional relationship detection module 2) 215 and the presence of a boundary. The delay period detection control circuit 116 also detects a delay period relative to video display and audio output in its device (source device 100) when the source device 100 transmits content data to the second reproducer 200 for video display and audio output. The delay period detection control circuit 116 then stores the delay period in a memory. In detecting the delay period, the delay period detection control circuit 116 detects a time difference (delay period, delay time) between sound output by the sink device 200 and sound output by the device 100.

For example, the delay period is detected as follows. First, when content data which is not delay-corrected is read, the device 100 decodes and outputs the content data, and transmits the content data to the sink device 200 to output the sound of the content data. Here, the sink device 200 decodes and outputs the content data on receipt of the content data, so that the source device 100 detects the sound output by the sink device 200, and detects a time difference between the sound output by the sink device 200 and the sound output by the source device 100. The content data used for the detection of the delay period may be, for example, content data including a model sound for delay period detection, or content data for normal content (a movie or broadcast content).

When correcting a delay, the delay period detection control circuit 116 controls the timing of video display and audio output in the device 100 in accordance with the delay period stored in the memory. That is, when the display/output timing in the sink device 200 is delayed relative to the display/output timing in the device (source device 100), the sink device 200 delays its video display and audio output in conformity to the display/output timing in the source device 100. On the other hand, when the timing of video display and audio output in the sink device 200 is earlier than the timing of video display and audio output in the device 100, the radio communication unit 101, for example, is used to report the delay period to the sink device 200 and instructs the sink device 200 to delay its video display and audio output by the delay period. The delay period here is the delay period of the output timing in the source device 100 relative to the output timing in the sink device 200.

The delay period detection control circuit 116 may detect a delay period for each encoding format of content data, and store the detected delay period for each encoding format in the memory. This is attributed to the fact that the time required for the sink device 200 to receive content data and output images and sound may vary depending on the encoding format. The time required for the source device to read content data and output images and sound may vary depending on the encoding format.

In this case, when the content data is transmitted to the sink device, the delay period detection control circuit 116 may identify the encoding format of the content and correct the delay period in accordance with the identified encoding format. The delay period detection control circuit 116 may correct even contents in the same encoding format by different delay periods depending on whether the contents are copyright-protected contents. The protected content is encoded by a predetermined encoding format and transmitted. Therefore, when the protected content is processed, encoding processing in the source device 100 and decoding processing in the sink device may be added to the processing of unprotected content. That is, the delay period between the output timing in the source device 100 and the output timing in the sink device 200 may vary depending on whether content is protected. Therefore, the delay period detection control circuit 116 may detect delay periods for the protected content and the unprotected content regarding content data in the same encoding format, and store the delay periods. When the content is transmitted, the delay period detection control circuit 116 may perform suitable delay period control depending on the encoding format and depending on whether the content is protected.

The speaker (audio reproduction module 1) 117 reproduces sound (audio) from the audio signal supplied from the DSP 113, and outputs sound (audio) audible to the user.

The microphone (acoustic signal detection module 1) 118 detects, for example, the speech of the user and sound (audio) output by the communication partner device, and is used to generate sound (audio) data available to the source-sink positional relationship detection module 115 to estimate (detect) the distance from the communication partner (for example, the second reproducer 200) and the presence of a boundary (for example, a wall in a house), or used for one user instruction inputting method called voice input.

In the source device 100, the source-sink positional relationship detection module 115, the delay period detection control circuit 116, and the microphone 118 can be omitted depending on, for example, the use and size (stationary/portable) of the reproducer. For example, the microphone 118 can double as the speaker 117.

Figure 2B:
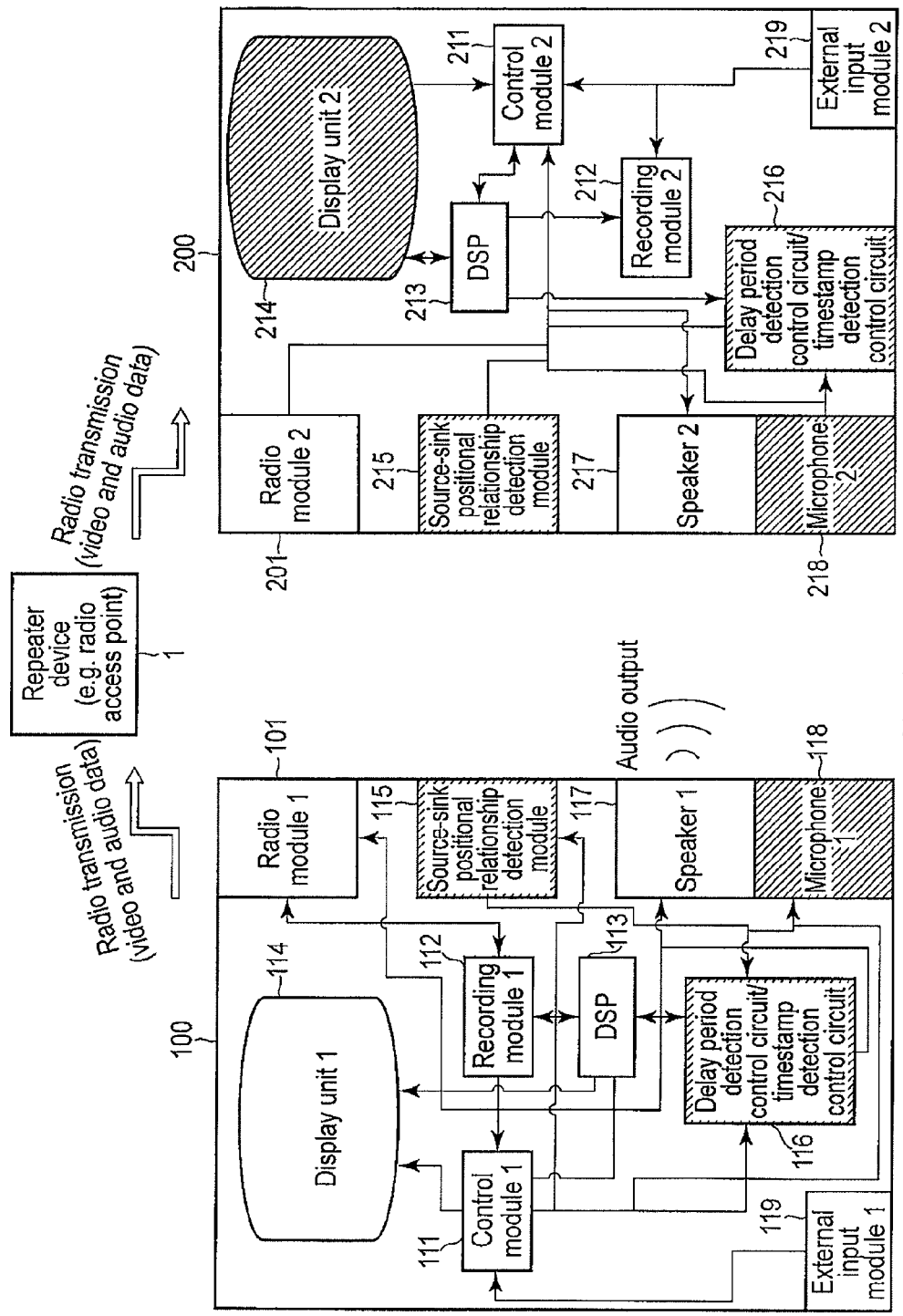
FIG. 2B is an exemplary diagram showing an example of the primary components of the first reproducer (source device) and the second reproducer (sink device) according to an embodiment.

The primary components of the first reproducer (source device) and the second reproducer (sink device) shown in FIG. 1B are illustrated in FIG. 2B.

The sink device (portable terminal device) 200 comprises a main controller (control module 2) 211, a recorder (recording module 2) 212, a signal processing module (digital signal processor [DSP] 2) 213, a display unit (monitor module (video display device or display) 2) 214, a source-sink positional relationship detection module (positional relationship detection module 2) 215, a delay period detection control circuit (timestamp detection control circuit, delay detection module 2) 216, a speaker (audio reproduction module 2) 217, a microphone (acoustic signal detection module 2) 218, and an external input module (input module 2) 219 for receiving the input of video signals and sound (audio) signals, that is, content. The main controller (control module 2) 211 is connected to the radio communication unit (radio communication module/means 2) 201. The radio communication unit (radio communication module/means 2) 201 does not exclusively communicate directly with the communication partner device (first reproducer 100), and has only to be able to communicate with the router 1, as in the example shown in FIG. 1B.

The configurations and operations of the main components of the sink device 200 shown in FIG. 2B are similar to those of the source device illustrated in FIG. 2A (components having the same names function in a substantially similar manner) and are therefore not described.

Although described later in detail, the source-sink positional relationship detection module (positional relationship detection module 2) 215 estimates (detects) the distance from the communication partner (for example, the first reproducer 100) with which the radio communication unit 201 communicates, and the presence of a boundary (for example, a wall in a house) therebetween.

Substantially as in the example that has already been described with reference to FIG. 2A, the delay period detection control circuit (timestamp detection control circuit, delay detection module 2) 216 controls whether to execute delay correcting processing in accordance with the distance estimated by one of the source-sink positional relationship detection module (positional relationship detection module 2) 215 or the source-sink positional relationship detection module (positional relationship detection module 1) 115 and the presence of a boundary. The delay period detection control circuit 216 also detects a delay period of video display and audio output in the sink device relative to video display and audio output in the source device when images are displayed and sound is output on receipt of content data from the source device. The delay period detection control circuit 216 then stores the delay period in a memory. In detecting the delay period, the delay period detection control circuit 216 detects a time difference (delay period, delay time) between sound output by the source device and sound output by the sink device.

For example, the delay period is detected as follows. First, when content data which is not delay-corrected is received from the source device 100, the sink device 200 decodes and outputs the content data. Here, the source device 100 also decodes and outputs the content data, so that the sink device 200 detects the sound output by the source device 100, and detects a time difference between the sound output by the source device 100 and the sound output by the sink device 200. The content data used for the detection of the delay period may be, for example, content data including a model sound for the detection of the delay period, or may be normal content.

When correcting a delay, the delay period detection control circuit 216 controls the timing of video display and audio output in the device 200 in accordance with the delay period stored in the memory. That is, when the output timing in the sink device 200 is delayed relative to the output timing in the source device 100, the sink device 200 reports the delay period to the source device 100 and instructs the source device 100 to delay its video display and audio output by the delay period. On the other hand, when the timing of video display and audio output in the sink device 200 is earlier than the timing of video display and audio output in the source device 100, the sink device 200 delays its video display and audio output by the delay period, or reports the delay period to the source device 100 to delay the transmission timing of the content data by the delay period.

The delay period detection control circuit 216 may detect a delay period for each encoding format of content data, and store the detected delay period for each encoding format in the memory. In this case, when the content data is transmitted to the sink device, the delay period detection control circuit 216 may identify the encoding format of the content and correct the delay period in accordance with the identified encoding format. The delay period detection control circuit 216 may correct even contents in the same encoding format by different delay periods depending on whether the contents are copyright-protected contents. That is, the delay period detection control circuit 216 may detect delay periods for the protected content and the unprotected content regarding content data in the same encoding format and store the delay periods. When images are displayed and sound is output on receipt of content, the delay period detection control circuit 216 may perform suitable delay period control depending on the encoding format and depending on whether the content is protected.

In the sink device 200, the display unit 214, the source-sink positional relationship detection module 215, the delay period detection control circuit 216, and the microphone 218 can be omitted depending on, for example, the use and size (stationary/portable) of the reproducer. For example, the microphone 218 can double as the speaker 217.

The primary operation according to the embodiment is shown in FIG. 3 in a software fashion.

In the interconnection between the source device and the sink device shown in FIG. 1A and FIG. 2A or in FIG. 1B and FIG. 2B, various output forms are produced regarding audio reproduction (audio output) in the sink device. For example, the sink device reproduces sound independently of the source device, or the sink device does not reproduce sound (audio output is set to "0") for the following reasons:

(A) the source device and the sink device are located in the same room (space);
 a) sound output by the source device is sufficiently audible in the position of the sink device;
 b) sound output by the source device is sufficiently audible in the position of the sink device, and subtitle indication, for example, is reproduced in the sink device;
 c) sound output by the source device is sufficiently audible in the position of the sink device, and voices in different languages are reproduced in the sink device;
 d) the sink device is too far from the source device to hear sound output by the source device, and cannot hear the sound output by the source device (in the position of the sink device);
 e) there is a barrier (for example, an ornamental plant which does not block sound) between the sink device and the source device; and
 f) there is a barrier (for example, a bookshelf which blocks sound) between the sink device and the source device, and (B) the source device and the sink device are located in different rooms (spaces);
 a') sound output by the source device is sufficiently audible in the position of the sink device;
 c') sound output by the source device is sufficiently audible in the position of the sink device, and voices in different languages are reproduced in the sink device; and
 d') sound output by the source device is not audible in the position of the sink device.

When the sink device is a portable device, for example, there is also a case where
 C) the sink device is driven by a non-AC (commercial) power source such as a battery or a fuel battery.

That is, as shown in FIG. 3, the sink device is detected to be located in a delay correction area [311],
 the delay correction is detected to be necessary when the sink device is detected to be located in the delay correction area [312],
 the delay correction is detected to be executable [313], and
 a "delay correction" is made to the sound reproduced by the sink device [314],
so that the audio reproduction (audio output) in the sink device can be set to a suitable form (lip-sync with reproduced images).

As described above, the "delay correction" is often made to eliminate the difference between the sound transmitted by the source device and reproduced by the sink device and the sound reproduced by the source device. For example, the "delay processing" may be performed for the video reproduction by the sink device depending on, for example, the speed of video decoding (time required for decoding) by the sink device. There is a possibility that the "delay correction" is substantially unnecessary depending on the speed of audio decoding (time required for decoding) by the sink device.

On the other hand, when the sink device is detected to be located in the delay correction area [311-YES] and when the delay correction is detected to be not necessary (the "delay correction" is unnecessary) [312-NO], current reproduction setting (conditions) is maintained.

When the sink device is detected to be located in the delay correction area [311-YES] and when the delay correction is detected to be necessary [312-YES], it is detected that, for example, "delay reduction processing" for stopping the audio output is executable [315] if the delay correction is detected to be not executable [313-NO].

When the "delay reduction processing" is detected to be executable [315-YES], a device to preferentially stop audio output, for example, a battery-driven (non-AC-driven) device is detected [316], and the audio output of this device is preferentially stopped [317]. When there is no device to preferentially stop audio output [315-NO], the audio output from one of the sink device and the source device that allows its audio output to be stopped (the device which has no problem or which makes little difference if its audio output is stopped) is stopped [318].

When the sink device is not located in the delay correction area [311-NO], it is detected that the "delay correction" is executed in consideration of the case where the "delay correction" is already executed in the target sink device [319].

That is, when the device which has been located in the delay correction area moves out of this area, for example, because of the movement of the user, the already executed "delay correction" is unnecessary. Therefore, when the position of the sink device is detected to be out of the area targeted for the "delay correction", it is preferable to finish the "delay measures (delay correction)" (to output sound by the synchronization of the source and the sink) [320].

The "delay measures (delay correction)" described above with reference to FIG. 3 can be performed by the sink device and the source device that permit the "delay measures (delay correction)". Therefore, regarding initial setting [301], it is preferable to previously check, for example, the following:

1) a delay correcting circuit is prepared (installed);
2) the source device can be synchronized with the sink device;
3) a period X of ascertaining whether a delay correction is made can be independently set (X is a numerical value prescribed by a predetermined module), and
4) information on the capability of the device.

Moreover, as described above, the sink device may not be adapted to the "delay correction", but may accept "correction reduction measures" that typically comprise the stopping of the audio output. Therefore, in the initial information (initial setting), it is preferable to acquire 5) information on whether the partner device is a device adapted to energy saving, that is, a non-AC-driven (battery-driven) device.

When it is found out from the initial information (initial setting) that the "delay correction" is executable, it is preferable that a "predetermined waiting time" corresponding to a checking time necessary to determine whether to make a correction is reserved (the transmission of content is suspended for a given length of time) at the time of the transmission of content from the source device to the sink device.

Furthermore, it is preferable that the above-mentioned information regarding the execution (or cancellation) of the "delay correction" is held in a recording medium (for example, a firmware in the main controller, or an SDRAM). Considering a small number of factors that change the source-sink distance, for example, in the home, the above-mentioned information regarding the execution of the "delay correction" may be recorded in an unshown nonvolatile memory used, for example, to hold timer recording information.

Figure 4:
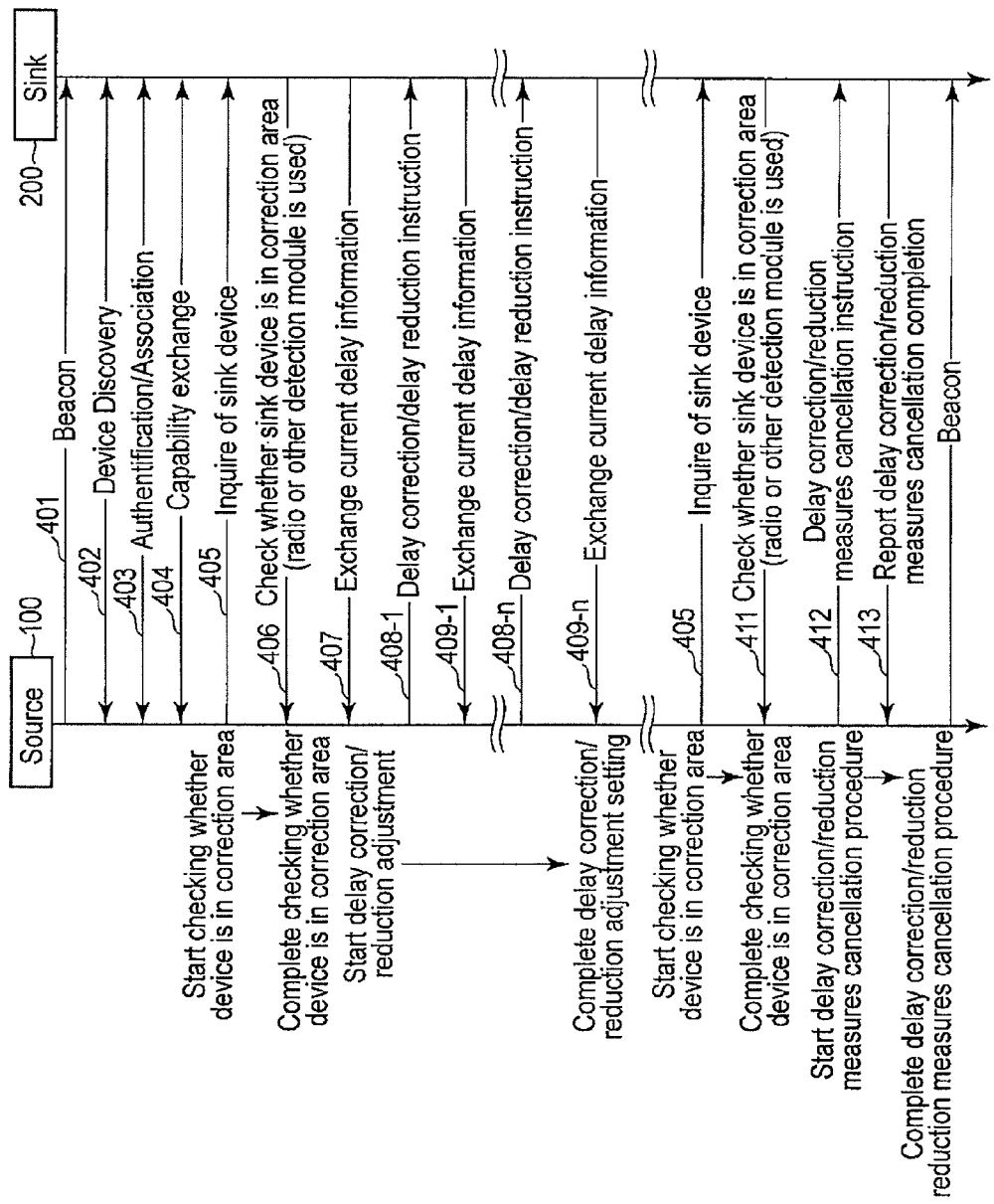
FIG. 4 is an exemplary diagram showing an example of the detection of the distance between the reproducers and the setting of audio output transmission timing according to an embodiment.

The sequence for implementing the embodiment shown in FIG. 3 is described in FIG. 4.

First, the source device outputs a "beacon" (detection signal) at every predetermined period to check the presence of the sink device [401].

When the sink device responds to the "beacon", the source device and the sink device respectively recognize their partner devices (device discovery [detection]) [402].

Furthermore, the source device and the sink device respectively certify that their partner devices permit a "delay correction"/"delay measures" (authentication/association <agreement, confirmation>) [403].

The devices then mutually check "device capability information" by capability exchange [404].

The source device then starts "inquiring of the sink device" [405]. In accordance with the response from the sink device, the source device uses a later-described checking method, for example, using radio or other detection module, to check whether the sink device is located in the correction area [406].

The sink device also reports, for example, the presence of a currently used "delay correction" (delay information exchange) [407].

The source device which has received a report from the sink device as to the presence of the currently used "delay correction", and the sink device repeat the "delay correction/delay reduction instruction" and "current delay information exchange", for example, regarding whether to permit the setting of the use of the "delay correction", a "correction amount" when the "delay correction" is used, and whether to execute a "delay reduction measures" when the "delay correction" cannot be used [408-1 to 408-m (m is a positive integer), 409-1 to 409-n (n is a positive integer)].

As a result, the amount of the "delay correction" made to the sink device or the source device or the execution of the "delay reduction measures" are set.

As has already been described with reference to FIG. 3, the position of the sink device may change with the movement of the user. Therefore, it is preferable that the above-described [405] to [409-n] are repeated periodically (at every given period).

When it is detected by repeating the above-described [405] to [409-n] that the position of the sink device has changed and the sink device is located out of the "delay correction" area, whether the cancellation of the "delay correction/delay reduction measures" already described with reference to FIG. 3 is needed is checked. When it can be detected that the cancellation is needed (the "delay correction/delay reduction measures" is unnecessary) [411], a cancellation instruction is given to the sink device or the source device to which the "delay correction" is made [412].

The currently executed "delay correction/delay reduction measures" is finished in the sink device or the source device to which the cancellation instruction is given. As a result, "cancellation completion" is reported to the partner device [413].

Now, an example of the method of detecting whether the sink device is located in or out of the "delay correction" area is shown.

Figure 5:
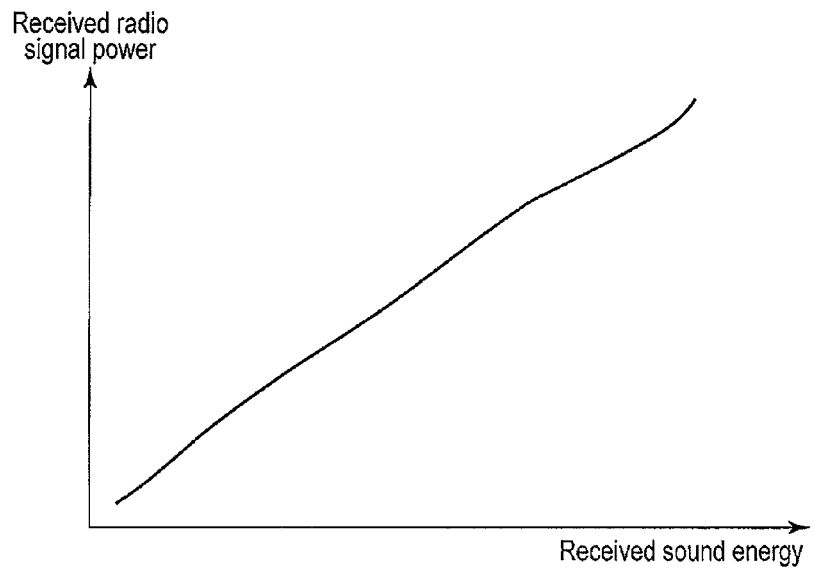
FIG. 5 is an exemplary diagram showing an example of the principle of the detection of the distance between the reproducers according to an embodiment.

FIG. 5 shows the relationship between the volume (energy) of sound acquired by the microphone (sound (audio) output detection module) 118 of the source device 100 (the microphone 218 of the sink device) and the intensity (electric field intensity) of a signal received by the radio communication unit 101 (201 in the sink device).

As apparent from FIG. 5, the volume of sound is substantially in inverse proportion to the intensity of the radio signal. Thus, for example, the sound reproduced by the partner device (or a startup melody output when power is applied) is acquired by the microphone mostly provided in the source device or the sink device. From the volume of the sound, the distance from the partner device can be estimated.

Figure 6:
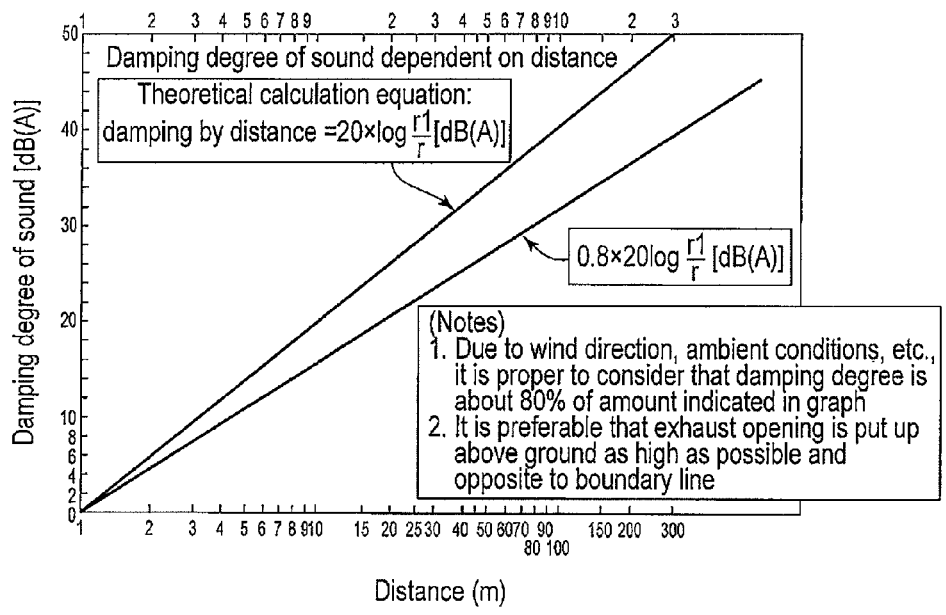
FIG. 6 is an exemplary diagram showing an example of the principle of the detection of the distance between the reproducers according to an embodiment.

FIG. 6 shows the relationship between the volume of the sound (startup melody) of the partner device detected by the microphone (sound (audio) output detection module) and the inter-device distance.

In a special case where there is a barrier (for example, a bookshelf which blocks sound) between the devices, the damping level (damping amount) of the sound (startup melody) acquired by the microphone is proportional to the square of the inter-device distance (reaches one part of the square of the distance as the distance increases) (generally in a sight distance).

Therefore, if it is known that the volume of the sound (startup melody) output by the sound source (partner device) is under a predetermined condition, the inter-device distance can be estimated in accordance with the volume of the sound (startup melody) detected by the microphone. On the other hand, it is necessary that the sound (startup melody) detected by the microphone be the sound (startup melody) corresponding to the signal transmitted from the transmitter (it is necessary to consider that the sound acquired by the microphone is only noise). An "auto-correction function (ACF)" described below with reference to FIG. 7 and FIG. 8 is used to specify that the sound (startup melody) acquired by the microphone is the sound used to measure (detect) the distance from the partner device, thereby detecting the inter-device distance.

That is, the relationship between a time function p(t) and ACF can be found by Equation (1) to (3) wherein "t" is a delay time and "2T" is an integral interval. It is recognized that ACF and the power spectrum have mathematically the same information when $P_d(\omega)$ is a power spectrum of a sound source signal.

$$\Phi_p(\tau) = \lim_{T \to \infty} \frac{1}{2T} \int_{-T}^{+T} p(t)p(t+\tau)dt \tag{1}$$

$$\Phi_p(\tau) = \int_{-\infty}^{+\infty} P_d(\omega)e^{j\omega\tau}d\omega \tag{2}$$

$$P_d(\omega) = \int_{-\infty}^{+\infty} \Phi_d(\tau)e^{-j\omega\tau}d\tau \tag{3}$$

Equation (1), Equation (2), and Equation (3) are general formulas, and are shown at, for example, [www.ymec.com/hp/signal/acf.htm].

On the other hand, as shown in FIG. 7, ACF cuts out the signal p(t) which is as long as the integral interval "2T", so that a signal only delayed in time can be detected as p(t+1). That is, when p(t) and p(t+1) have high amplitude and are similar repetitive components, it can be detected that their ACFs (correlation value Fp(t)) increase, so that p(t) and p(t+1) are highly similar. Noise components (noise) different from the sound decrease in the ACF value in a short time as shown by way of example FIG. 8. Therefore, the similarity to the sound (startup melody) can be detected by using ACF.

More specifically, a real audio signal obtained from audio (sound) which is transmitted through the speaker of the source device and which is collected by the microphone of the sink device is recorded for a given length of time. The correlation between the real audio signal and an audio signal which has arrived in the sink device by radio and decoded therein is calculated in the predetermined interval 2T. The start time of the interval 2T is sequentially shifted to calculate a time difference which is highly correlative, that is, which permit the highest similarity of waveforms. When the used signal has a change on a time axis, the time difference having the highest similarity of waveforms is a delay time, and is a correction amount on the time axis. The correction amount on the time axis, that is, the above-mentioned time difference corresponds to the difference between the sound transmitted by radio and the microphone-collected sound that may be actually audible to a person (user). When the user has the sink device at hand, sound is collected by the sink device at hand so that a delay time can be determined in such a manner as to take into consideration the delay of sound attributed to the source-sink distance. That is, a delay period in a more natural state can be determined so that sound arrives at a distance later. An audio signal necessary for a correction does not necessarily have to be, for example, a periodic pulse for training (for the repetition of the operations in [405] to [409-n ] which will be described later with reference to FIG. 4). If the above-mentioned ACF is used, a correction amount can be determined by using actually traveling sound which has a given waveform.

The volume of the sound (startup melody) changes with the reproduction level (volume setting) of the partner device and the sensitivity (gain) of the microphone. It is thus preferable to set a correction amount (and the inter-device distance) by repeating (training) the operations in [405] to [409-n] shown in FIG. 4.

On the other hand, an actual delay period can be easily found by comparing a timestamp acquired from the content by the delay period detection control circuit (timestamp detection control circuit, delay detection module 1) 116 of the source device 100 (see FIG. 1A, FIG. 1B, and FIG. 2A), that is, timestamp information in a packet identifier PID attached to a TS packet of a transport stream (TS), with timestamp information acquired from the content by the delay period detection control circuit (timestamp detection control circuit, delay detection module 2) 216 of the sink device 200 (see FIG. 1A, FIG. 1B, and FIG. 2B).

That is, [405] to [409-n] described above with reference to FIG. 4 are repeated in the above-mentioned training to estimate a distance, set a delay period that conforms to the estimated distance, and determine whether the delay period set by the sound (audio) output reproduced by the partner device is a delay period optimum to the estimated distance. This can prevent the user from having difficulty in hearing the sound, for example, due to a time difference in sound (audio) reproduction outputs between the source device and the sink device that are located at a predetermined distance from each other.

The inter-device distance between the source device and the sink device is thus found. As a result, various output forms can be set for the audio reproduction (audio output) in the sink device (source device) in accordance with the instruction from the user or the position of the user. For example, the sink device (or the source device) reproduces sound independently of the source device (or the sink device), or the sink device (or the source device) does not reproduce sound (audio output is set to "0"), in accordance with the various factors classified into (A)a) to (A)f) and (B)a'), (B)c'), and (B)d') as described above.

For example, suppose that family members gather. There is a television set having a large screen for reproducing content. For example, one of the family members has a tablet device (sink device) at a distance from the source device. This person views images displayed by the tablet device and listens to the sound reproduced by the tablet device. The person having the tablet device simultaneously (redundantly) hears, with a time difference, the sound reproduced by the tablet device and the sound which is reproduced by the source device and which directly approaches the tablet device. In this case, a "delay correction" is made to one of the audio outputs. This can prevent the problem of redundantly hearing the sounds reproduced by the respective devices.

Furthermore, for example, when a person enjoying content by the tablet device is located in the vicinity of the source device, the sound output by the tablet device is set to "0".

Otherwise, for example, when more than one user use their tablet devices to reproduce the same content, one of the tablet devices only outputs sound (audio). This can inhibit two or more audio outputs that are redundantly audible with discomfort for the same reproduced images.

The user having the tablet device (sink device) may move, and the inter-device distance between the tablet device and the source device may change. In this case, [405] to [409-n] described above with reference to FIG. 4 are repeated to set a new a "delay correction" amount, or the "delay correction" is canceled. This can inhibit two or more audio outputs that are redundantly audible with discomfort for the same reproduced images.

The above-described embodiment can be carried out in various forms described below.

For example, the above-described embodiment can be carried out, for example, by a source device provided to display images or generate sound, and a sink device provided to receive the images or audio signal information by radio. The source device 100 comprises the display unit 1, the radio module (1) 101, the control module (1) 111, the recording module (1) 112, the speaker (1) 117, and the external input module (1) 119. The sink device 200 comprises a radio module (2) 201, the speaker (2) 217, the control module (2) 211, and the external input module (2) 219. One of the source device and the sink device comprises at least one microphone, a delay period detection control circuit or timestamp detection control circuit, and source-sink positional relationship detection module. Sound generated by the speaker (1) 117 or the speaker (2) 217 attached to one of the source device and the sink device is received by the microphone (1) 118 or the microphone (2) 218 attached to the other device in accordance with information obtained by the delay period detection control circuit or timestamp detection control circuit 116 or the delay period detection control circuit or timestamp detection control circuit 216 shown in FIG. 2A and/or FIG. 2B. The delay period of the sound or the images on the time axis is determined, and the delay is controlled. The source-sink positional relationship detection module 115 or the source-sink positional relationship detection module 215 controls whether to control the delay and controls the on/off of the speaker (1) 117 or (2) 217.

That is, the sound generated from one speaker is detected by the other microphone to determine a delay period so that sound can be output from one or both of the microphones. The synchronization of sounds can be linked to the synchronization of images by the lip-sync of sounds and images in the sink device and the source device. Moreover, the source-sink positional relationship detection module can turn on/off the delay control. This advantageously enables automatic control. For example, when persons are in the same room, a synchronization mode is set. When persons are in different rooms, a delay is minimized by independent operations.

Furthermore, the above-described embodiment can be carried out, for example, by using the source-sink positional relationship detection module as a means for determining whether to control the sound delay and whether to control the on/off of the speaker (1) 117 or (2) 217.

As a result, the positional relationship between the source and the sink is known. Therefore, when the source and the sink are close to each other, the delay is controlled, or sound is only output from one microphone. On the other hand, when the sink and the source are located apart from each other, the delay control is unnecessary for the user, or the delay control can rather be turned off to prioritize the quick response performance.

Furthermore, the above-described embodiment can be carried out, for example, if the source-sink positional relationship detection module is position specifying module that uses an audio microphone, a camera, radio reception sensitivity/reception quality, a motion sensor, a global positioning system (GPS) reception output, and radio charge collection system (Paid) network base station information or wireless local area network (LAN) base station information, or is composite position specifying module that uses the combination of the above.

That is, when the source device and the sink device are at a distance from each other, for example, are in different rooms, any active (available/on-state) module/means can be used for detection without using exclusive detection module.

Furthermore, the above-described embodiment can be carried out, for example, by preparing detection values of more than one detection module as a conversion table.

That is, the advantage is that the positional relationship between the source device and the sink device can be known by the positional relationship detection module which is normally in operation and the sound (audio) can be controlled. For example, it is known that the energy amount of the sound received by the microphone is determined in inverse proportion to the square of the distance from the sound source. On the other hand, it is known, for example, from a Friis formula that the radio signal used to transmit images/sound from the source device to the sink device is damped in inverse proportion to the square of the distance from the sound source. This proves that if the energy of the received sound is set to a horizontal axis and received radio signal power is set to a vertical axis, the relationship therebetween can be approximated by a straight line that passes through the origin in the case of a clear interval without any blockage. As has been described with reference to FIG. 5, whether to correct the delay period can be determined by using a predetermined threshold as a standard.

Furthermore, the above-described embodiment can be carried out, for example, if the delay period detection control circuit/timestamp detection control circuit compares the sound (audio) signal [A] generated in the speaker (1) 117 or the speaker (2) 217 of one of the source device and the sink device with the sound (audio) signal [B] output from a speaker different from the above speaker, and thereby determines a delay period to be corrected and determines whether a correction is needed.

That is, when there is no delay of sound, the correlation values relative to mathematic characteristics (for example, a sliding amount when a sliding correlation is calculated) of the audio signal [A] generate from the speaker (1), for example, and the audio signal [B] generate from the speaker (2), for example, behave in a similar manner. On the other hand, when there is a delay of sound, a delay period that approaches a condition having a single sound source is estimated by using the fact that the correlation values do not correspond to each other (estimated by auto-correlation).

For example, the auto-correlation can be found by Equation (4)

$$z(\tau) = \int_{-\infty}^{+\infty} h(t)x(t+\tau)dt \quad (4)$$

wherein the correlation of two functions $h(t)$ and $x(t)$ is represented by $z(\tau)$, and $z(\tau)$ is obtained by shifting and multiplying $h(t)$ and $x(t)$ by $\tau$ and integrating the result within a predetermined interval.

Furthermore, the above-described embodiment can be carried out, for example, if the delay period detection control circuit/timestamp detection control circuit is obtained by hardware or software processing. That is, even when no hardware is provided, the above-described embodiment can be carried out by a software package.

Furthermore, the above-described embodiment can be carried out, for example, if speakers are provided in both the source device and the sink device, and the source-sink positional relationship detection module is an audio microphone. When a detection audio output of the speaker of the source device or the sink device is beyond a first threshold, one of the speakers is only used. When the detection audio output is equal to or less than a second threshold, both the speakers of the source device and the sink device are turned on. That is, the problem of sound delays can be avoided by a simple configuration. For example, when the devices are in the same room, sound is only output from one device. When the devices are in different rooms and sound does not reach, sounds are output from both the devices.

Furthermore, the above-described embodiment can be carried out, for example, if the output from the speaker of one of the source device and the sink device is the output from the speaker attached to the device which is not battery-driven when one of the devices is battery-driven. That is, the consumption of the electricity of the battery-driven device can be prevented.

Furthermore, the above-described embodiment can be carried out, for example, if, as a means of measuring a delay period on the time axis, a delay period to be corrected is found by measuring more than one state as the states of the sound source depending on whether sound (audio) is output from the speaker (1) 117 or the speaker (2) 217 and finding the auto-correlations on the time axis. That is, the pitch of sound and the strength of the pitch of the sound can be known by the auto-correlations on the time axis, and can be compared with those in a condition with one sound source to obtain a delay period to be found. The auto-correlations can be easily found by sampling and filtering sounds collected by the microphone, recording the sounds in a register (which may otherwise be a signal processing unit or its firmware) at a sampling pitch or its integral multiple in order of time, multiplying the same data at different positions of the register and thereby figuring out the sum of the values. In the case of one sound source, the auto-correlation has a single peak when the shift amount (delay time) of the register is set to a horizontal axis. Even when there are two sound sources, the delay period is zero and the peak is at the same position as that in the case of one sound source if sounds from the two sound sources reach the microphone at the same time. When two sound sources are delayed, there are more than one peak. Thus, the waveform of one sound source is used as a reference value, and a shift amount of the register that corresponds to the reference value is found to obtain a delay time to be corrected. Therefore, the source device and the sink device are in lip-sync (the synchronization of images and sound), so that if the sound is synchronized with the sink device, the synchronization of images is improved accordingly.

Furthermore, the above-described embodiment can be carried out, for example, by creating the conversion table in accordance with gained values (acquired values) of more than one of the detection module at the same time. In this case, the conversion table can be easily created from the values obtained at the same time, that is, obtained when the positional relationship between the source device and the sink device is unique. Thus, whether the device is located in the correction area can be determined.

Furthermore, the above-described embodiment can be carried out, for example, by using, as the source-sink positional relationship detection module, detection module other than a training period for creating the conversion table and other than audio information. That is, the reception of sound by the microphone is finished at the end of the training period, and whether the device has entered the area can be easily determined, for example, by normally used radio reception intensity.

Furthermore, the above-described embodiment can be carried out, for example, by a mechanism and a circuit configuration in which at least one of the microphones doubles as the speaker (1) or the speaker (2), and the functions of the microphone and the speaker are switched and used on the time axis. That is, one component doubles as the microphone and the speaker in many mobile information terminals, which can be used to carry out the above-described embodiment.

Furthermore, the above-described embodiment can be carried out, for example, by replacing the source-sink positional relationship detection module with positional relationship detection module which is located between one of the source device and the sink device that greatly changes in radio signal quality with movement and a radio signal repeater, when a radio signal is transmitted from the source device to the sink device via the radio signal repeater. That is, when a radio signal is sent via an access point (AP), the device that changes in a radio channel between the source and the sink is used as the detection module such that the positional relationship can be more precisely known.

Furthermore, the above-described embodiment can be carried out, for example, by using at least one of the microphones of the source device and the sink device that is closer to the user. That is, a more suitable correction can be made to a sound delay including reverberations from the surroundings by using the position of the microphone close to the user as a standard position for sound delay correction. For example, when the source device and the sink device are 10 meters apart from each other, a delay of about 30 milliseconds is generated in the arrival time of sound if converted with a sound speed of 300 m/second. Therefore, the correction amount changes depending on whether to use the microphone of the source device or the sink device, so that a highly precise delay correction can be made by selecting a proper microphone closer to the user.

Various embodiments of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the embodiment described above, the source device is, for example, a television receiver (TV), but is not limited thereto. The various devices described as the sink devices may serve as the source devices. If the sink device has a microphone, a delay period can be measured. The present delay correcting method is also effective when the sink device does not have any speaker which is hardware for outputting sound. In this case, the sink device does not generate sound, and the present method is used to synchronize images between the sink and the source.

What is claimed is:

1. An electronic device comprising:
a delay detection module configured to detect a first delay amount of outputting of at least one of sound and images from the partner device; and
a position detection module configured to obtain data regarding a positional relationship between the electronic device and the partner device; and
a control module configured to perform a lip-sync function of controlling a second delay amount of outputting of sound from a speaker based on the first delay amount, and to effect switching between performance and non-performance of the lip-sync function in accordance with the positional relationship between the electronic device and the partner device.

2. The electronic device of claim 1, further comprising:
a reception module configured to receive a message including information indicating the first delay amount of outputting of content from the partner device,
wherein the delay detection module reads out the first delay amount from the message received by the reception module, and the control module sets the second delay amount of outputting of the sound from the speaker based on the first delay amount.

3. The electronic device of claim 2, further comprising:
a sound output module configured to cause the speaker to output the sound based on sound data; and
a communication module configured to transmit or receive the sound data to or from the partner device,
wherein the reception module receives the message during transmission or reception of the sound data.

4. The electronic device of claim 3, wherein the communication module transmits the sound data to the partner device,
the partner device outputs the sound based on the sound data transmitted from the communication module, and
the lip-sync function reduces a temporal difference between outputting of the sound from the speaker and that of the sound from the partner device.

5. The electronic device of claim 3, wherein the communication module receives the sound data from the partner device.

* * * * *